United States Patent [19]

Osterhout

[11] 3,918,669

[45] Nov. 11, 1975

[54] ARTICULATED POSITIONING DEVICE

[76] Inventor: George W. Osterhout, 6711 W. Homestead Drive, Indianapolis, Ind. 46227

[22] Filed: Nov. 1, 1974

[21] Appl. No.: 519,816

[52] U.S. Cl............ 248/206 R; 224/42.1 C; 248/278
[51] Int. Cl.² .................... A47F 1/16; B60R 9/04
[58] Field of Search .................. 248/206 R, 278; 224/42.1 R, 42.1 B, 42.1 E, 42.1 G

[56] References Cited
UNITED STATES PATENTS

| 782,816 | 2/1905 | Becker | 248/278 X |
| 1,723,238 | 8/1929 | Hoot | 224/42.1 E UX |
| 2,424,222 | 7/1947 | Brown et al. | 248/278 |
| 2,502,714 | 4/1950 | Garnett | 248/206 R X |
| 3,104,042 | 9/1963 | Gaus | 224/42.1 E |
| 3,243,497 | 3/1966 | Kendall et al. | 248/278 X |

FOREIGN PATENTS OR APPLICATIONS

| 784,563 | 5/1968 | Canada | 224/42.1 E |

Primary Examiner—J. Franklin Foss

[57] ABSTRACT

A device adapted to be affixed to a first member, such as a boat, as well as to a further member, such as a vehicle. Intermediate said first and further members, said device is pivotal about at least two axes, they being normal to each other.

1 Claim, 5 Drawing Figures

ARTICULATED POSITIONING DEVICE

BACKGROUND OF THE PRIOR ART

During this age of mobility, it has become desirable, and even necessary, to transport devices, such as recreational devices by vehicle, such as by automobile. Such recreational devices may be means of additional transportation, such as boats. Obviously, trailers have been utilized, but these are not only expensive, but are bulky and require substantial additional space. Various types of carriers have also been developed, that are adapted to be fixed to an automobile top. These represent substantial advances in the prior art. However, many that have been developed are expensive, unattractive, semi-permanent in nature, and may not be affixed to a boat other than by first erecting the boat onto the car top. It was to overcome some or all of these disadvantages that Applicant's invention was conceived.

SUMMARY OF THE INVENTION

A plurality of substantially identical devices would provide the connection between the transported object and the transporting object. Each device would include a combination fixing and scratch-resistant, suction cup at one end, a pivotal linking member at the other end, and a pivotal member intermediate the two ends.

DESCRIPTION OF A PREFERRED EMBODIMENT

Figure 1:
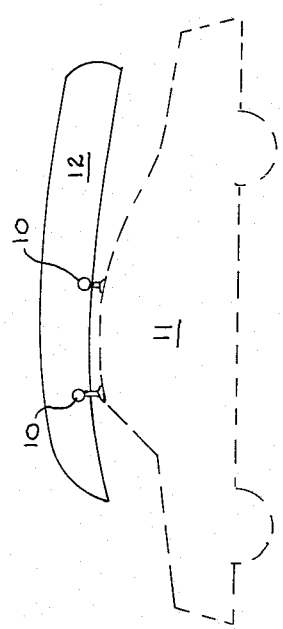
FIG. 1 is a side view of a transported object fixed to a transporting object by virtue of the device of this invention.

The transporting and positioning device of this invention, identified by numeral 10, is intended to provide a stable connection between a transporting object, such as the automobile 11 of FIG. 1, and the transported object, such as the boat 12 of the same figure. Obviously, other devices may form the transporting and/or transported object. However, the depicted objects provide a prime utilization due to the proliferation of recreational boats in use and the need for economic and compact transportation.

Figure 2:
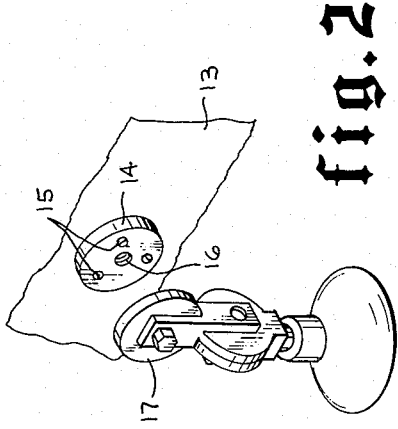
FIG. 2 is a perspective of the positioning device spaced from and prior to linkage with a counterpart member positioned on the transported object.

Moving on to the remaining figures, and especially FIG. 2, one side of boat 12 is indicated at numeral 13. Disc or plate 14 is removably attached, as by screws 15 passing through apertures therein, to said side. Such disc also includes a centrally disposed threaded aperture 16, for connection with the remainder of the positioning device. Juxtapositioned by disc 14, on assembly, is a further disc or plate portion 17. Said further portion is centrally apertured at 18, and is positioned intermediate disc 14 and lever arm 19, which lever arm is also apertured at 20. Apertures 18 and 20 are concentrically arranged, along with aperture 16, when assembly is accomplished. Assembly is made by slidably passing threaded fastener 21 through apertures 18 and 20, and threadedly engaging aperture 16 in disc 14.

Lever 19 forms an extension of upper body portion 22. Such upper body includes a further disc or plate portion 23, which portion 23 includes a central threaded aperture 24. The lower body portion 30 also includes a lever 31, which is centrally apertured, and a centrally apertured disc or plate portion 32. Threaded fastener 35 is shown, in FIG. 3, to extend through the apertures in lever 31, and in disc portion 32, to threadedly engage the threaded aperture in upper body portion 22.

The foot 36 of the lower body portion 30 includes a threaded extension 37 for engaging a threaded socket provided in suction cup 40.

Figure 5:
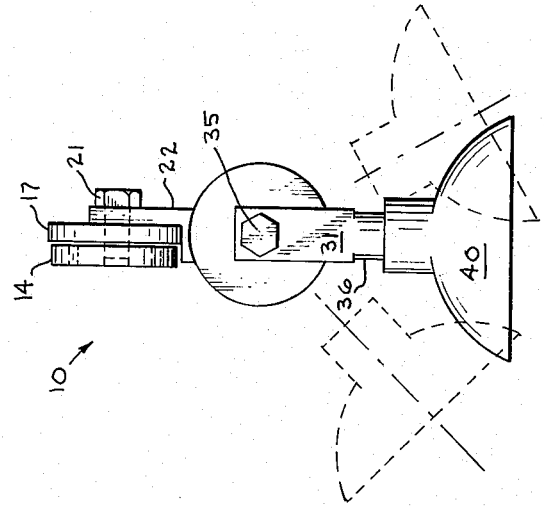
FIG. 5 is a side view of the positioning device, depicting, in phantom lines, possible positions permitted by the second pivotal connection.
Figure 4:
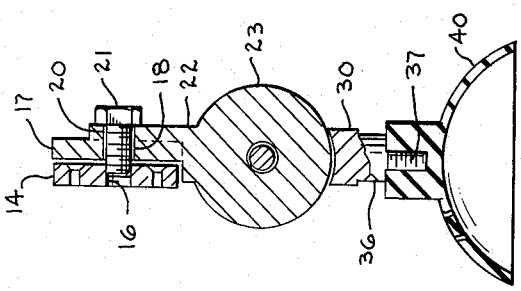
FIG. 4 is a vertical section taken along lines 4—4 of FIG. 3.
Figure 3:
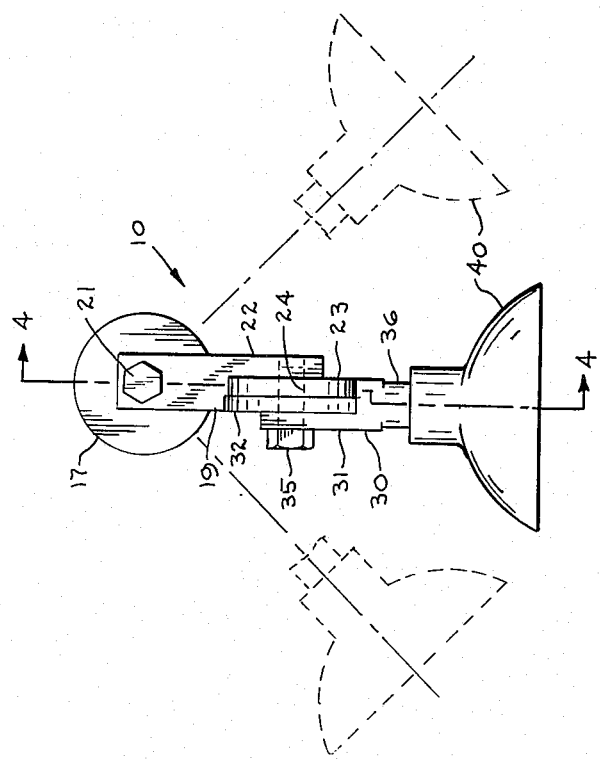
FIG. 3 is a plan view of the positioning device, depicting, in phantom lines, possible positions permitted by the first pivotal connection.

It should be noted that both of threaded fasteners 21 and 35 form pivots. FIG. 3 illustrates how the body portions may pivot about fastener 21, relative to disc 14, which is fixed to boat 12. FIG. 5 illustrates how the lower body portion may pivot about fastener 35, relative to the upper body portion. Obviously, such pivoting, prior to tightening up the fasteners, allow great mobility and ease of handling, when fixedly positioning a boat atop a car. This is especially true in that the pivots are normal to each other, allowing pivoting in perpendicular planes, approaching the mobility of a universal joint.

In actual use, a plurality of devices, such as two on each side, would be fixed to the transported object. Although different erection procedures are possible, the preferred one is as follows. Initially, the discs 14 would be fixed to side 12 of the craft, by fasteners 15. These may remain there semi-permanently. Although the remainder of the device may remain semi-permanently atop the vehicle, it is preferred that fastener 21 link disc 14 with the remainder of the device, prior to erection, i.e., that fastener 21 engage the threads of disc 14, after passing through apertures 18 and 20. The fit may be loose so that both fasteners 21 and 35 may function as pivots, during erection, for ease in placement. On lifting boat 12 atop the car, suction cups 40 may be positioned where desired on the roof. Pressure will cause suction to be created, securing the craft to the vehicle. If desired, tie-down means, such as cords or cables, may further secure the two. Such would be helpful in the event of a failure of suction, or if it were desired for cups 40 to merely function as scratch resistors.

Although only a single embodiment has been described, it should be obvious that numerous modifications would be possible by one skilled in the art without departing from the spirit of the invention. For example, abutting discs 14, 17 and 19, 23 need not be annular in configuration. Further, such discs may be separate elements from their respective levers or may form a physical extension thereof, as by welding. In any case, the scope of the invention is intended to be limited only by the following appended claims.

I claim:

1. A device for releasably fixing a boat to the top of a motor vehicle, said device including a plurality of units, each unit comprising:

first plate member adapted to be removably fixed to a side of said boat, said plate having a first threaded aperture centrally thereof;

suction cup means adapted to be removably fixed to said vehicle top;

second plate member having a first unthreaded aperture therethrough;

first pivot member passing through said first unthreaded aperture, threadedly engaging said first threaded aperture, and pivotally joining said first and second plate members with the first pivot axis being such that said relative pivotal movement of said plates is in a plane approximately parallel to the plane of said boat side;

third plate member fixed to said second plate member and perpendicular thereto, said third plate member having a second threaded aperture centrally thereof;

fourth plate member linked to said suction cup, said fourth plate member having a second unthreaded aperture therethrough;

second pivot member passing through said second unthreaded aperture, threadedly engaging said second threaded aperture, and pivotally joining said third and fourth plate members with the second pivot axis being perpendicular to said first pivot axis;

said first and second plate members as well as said third and fourth plate members being in abutting face to face arrangement when said first and second pivot members are fully made up.

* * * * *